F. W. CHRISWELL.
TRAILER FOR TRUCKS.
APPLICATION FILED JULY 5, 1916.

1,209,670.

Patented Dec. 26, 1916.
3 SHEETS—SHEET 1.

Inventor
Frederick W. Chriswell
By Henry L. Reynolds
Attorney.

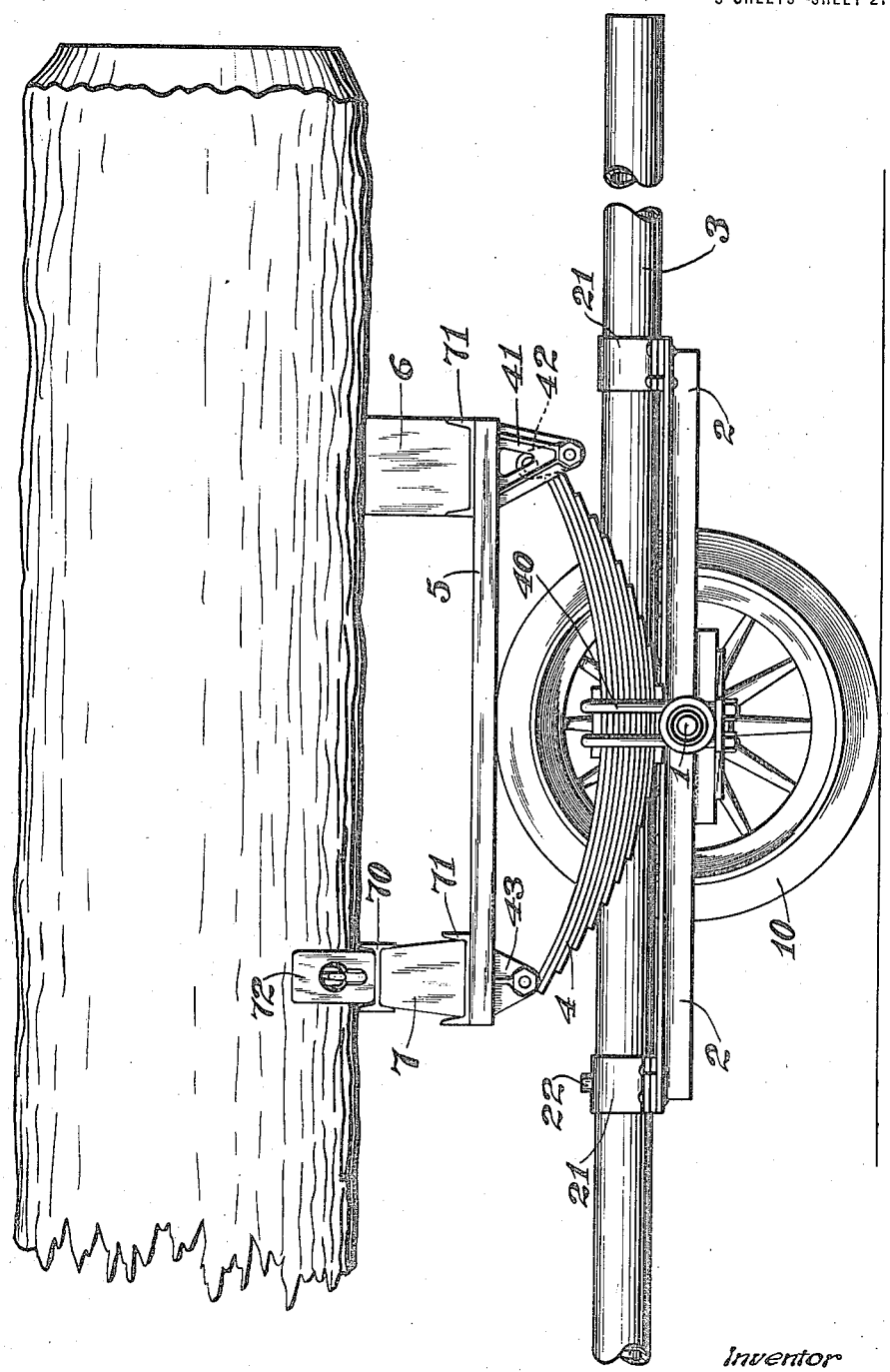

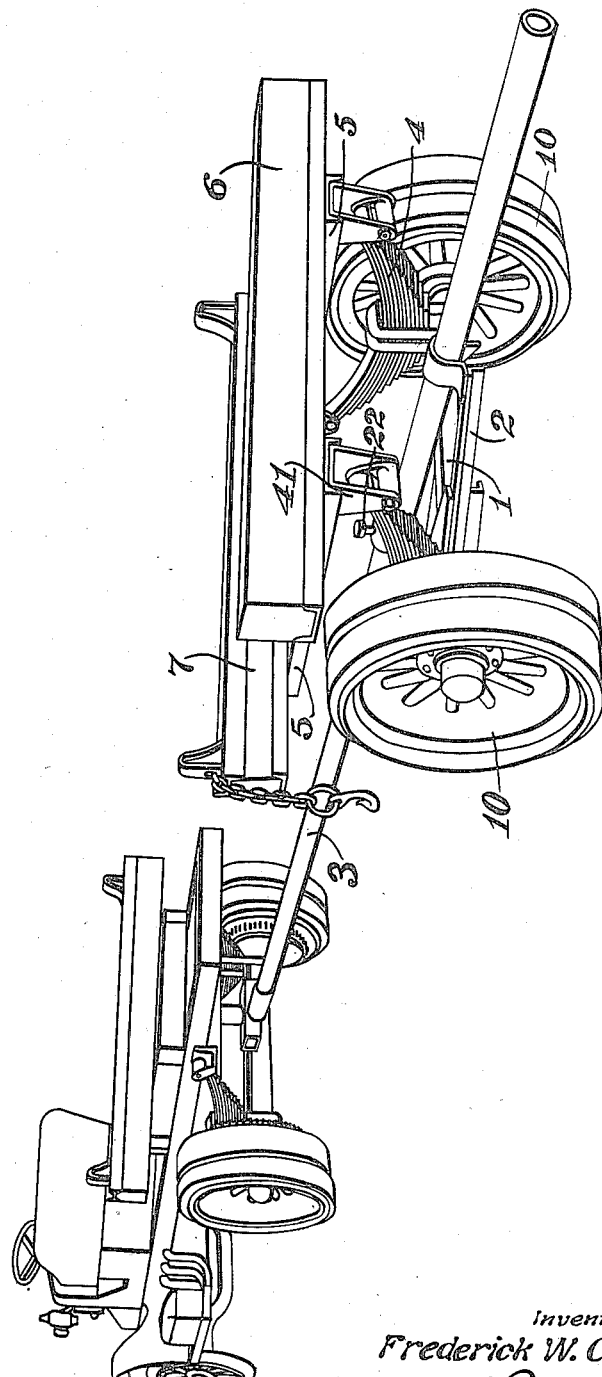

UNITED STATES PATENT OFFICE.

FREDERICK W. CHRISWELL, OF SEATTLE, WASHINGTON, ASSIGNOR TO SEATTLE CAR & FOUNDRY CO., OF SEATTLE, WASHINGTON, A CORPORATION OF WASHINGTON.

TRAILER FOR TRUCKS.

1,209,670.  Specification of Letters Patent.  Patented Dec. 26, 1916.

Application filed July 5, 1916. Serial No. 107,505.

*To all whom it may concern:*

Be it known that I, FREDERICK W. CHRISWELL, citizen of the United States, and resident of Seattle, county of King, and State of Washington, have invented certain new and useful Improvements in Trailers for Trucks, of which the following is a specification.

My invention relates to trailers or two-wheeled trucks intended for use in connection, more particularly, with automobile trucks for handling long timbers, beams and the like.

The object of my invention is to produce an effective simple and strong trailer truck which will be satisfactory when used in connection with such rough work as the hauling of logs. The device is, however, not limited in its use to the hauling of logs.

One particular object of my invention is to produce a trailer truck of such character that the bending strain produced upon the reach both in vertical and horizontal planes, may be very greatly reduced.

My invention comprises the novel parts and combinations thereof which will be hereinafter described and then particularly pointed out in the claims.

Figure 1:
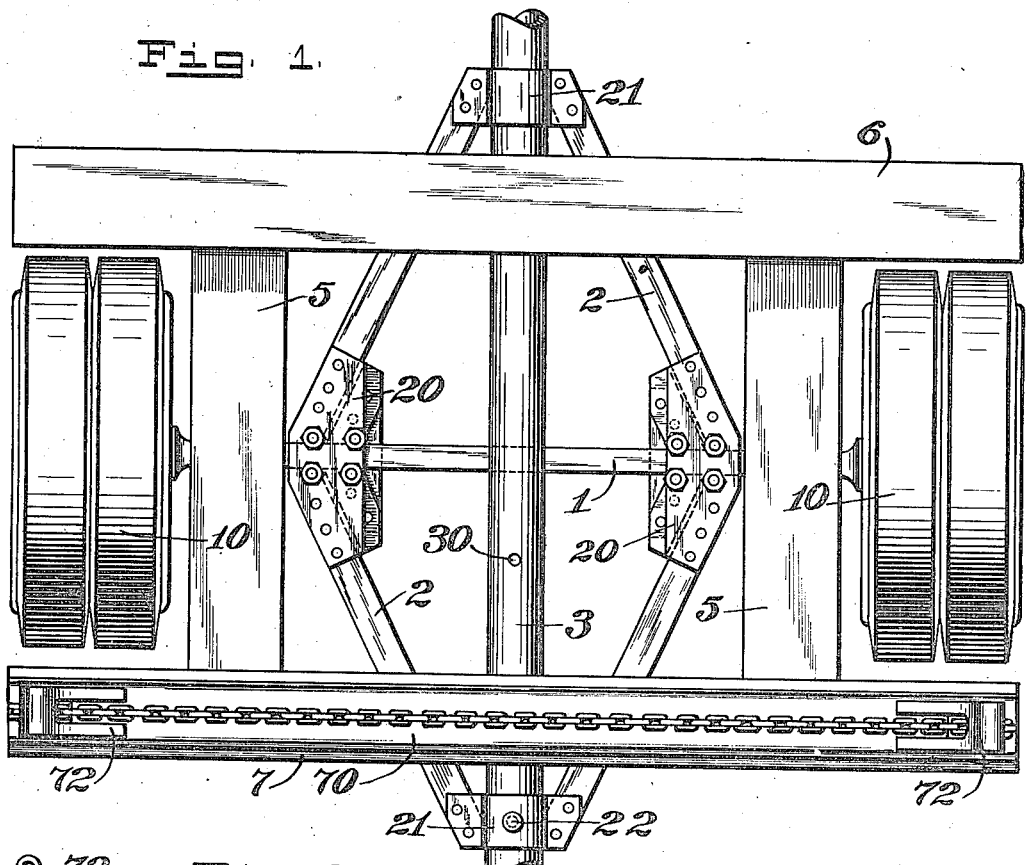
Figure 2:
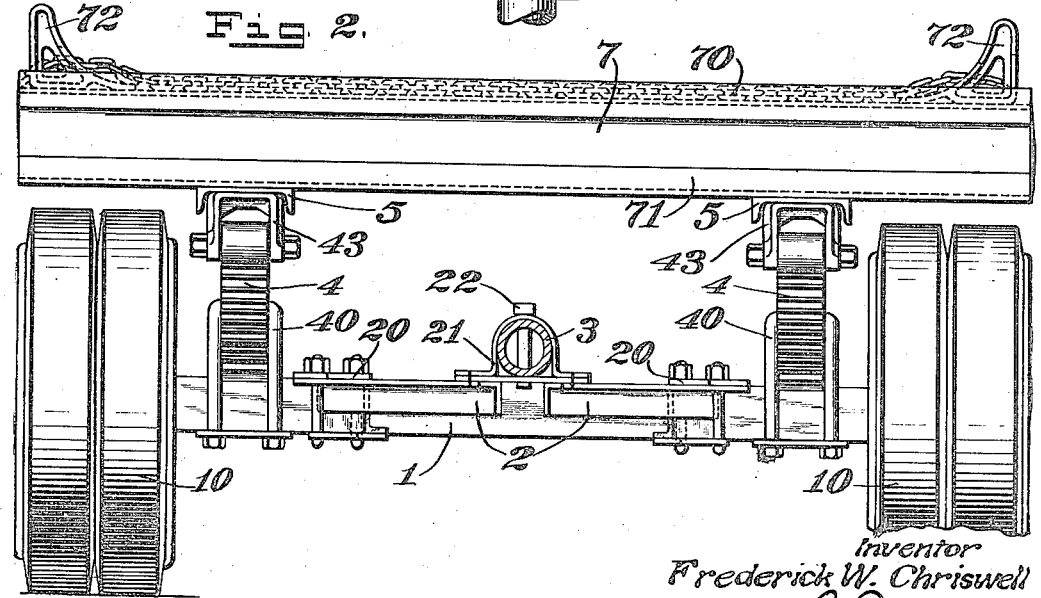

Figure 1 is a top plan view of the trailer truck. Fig. 2 is an elevation thereof looking lengthwise of the truck, or parallel with the reach. Fig. 3 is a side elevation, the near wheel having been removed. Fig. 4 shows, in perspective, my trailer connected to a truck.

In the adaptation of automobile trucks for such purposes as the hauling of logs, difficulty has occurred in connection with the use of a reach. These logs are often of considerable length and size. It is also necessary that they be supported at an elevation above that of the wheels of the truck. This means that the bunks upon which they are carried are at considerable distance above the axle. The weight of the log, therefore, acts at a considerable distance from the axle to produce fore-and-aft rocking movement, which rocking action brings a heavy bending strain upon the reach, making it necessary to make the reach very heavy, and consequently, hard to handle, or it is very likely to be broken.

The trailer truck, which is the object of this invention, has two wheels 10 mounted to turn upon an axle 1. Secured to this axle are hounds, which are preferably made from angle bars 2 joined to each other at the axle by plates 20 and secured to the axle by riveting and bolting. The front and rear ends are secured by plates, one of which, the plate 21, is arched upward to form an opening for the reception of the reach 3, which reach, as herein shown, is composed of a good sized iron pipe. One of the plates 21 is provided with a hole 22, and the reach 3 with corresponding holes 30, through which a pin may be dropped to connect the two together.

The trailer truck is provided with two bunks 6 and 7, which extend transversely of the trailer and are located, one forwardly and the other rearwardly of the axle, thus forming, with the axle, a triangle, the base of which is upward. The bunks are connected near their outer ends by two beams 5, which are herein shown as channel bars. These beams are placed just inside of the inner edges of the wheel 10. The bunks are, preferably, constructed by using a shallow bottom channel 71 and a wood filler beam 6 or 7, as the case may be. One of these bunks, as the bunk 7, is provided with an I-bar 70, covering its upper surface and forming the member which engages the log. The upper projecting flanges of the beam dig into the log and hold it in place against longitudinal movement of the log.

Under the ends of the beams 5, are the brackets 41 and 43, to one of which, 43, one end of the spring 4 is directly secured, and to the other one of which, 41, the other end of the spring is secured through the medium of a shackle 42, after the accepted manner of supporting automobile bodies.

The general arrangement of the parts described permits the use of semi-elliptical springs, which may be constructed of ample strength and cheaply. These springs also permit of a slight rocking of the bunks in a fore-and-aft direction, as may be produced in passing over inequalities in the ground. This rocking action will, however, be only slight and by reason of the fact that the two bunks 6 and 7, are considerably separated lengthwise the reach, can only be slight, as otherwise one of the bunks would be dropped down out of contact with the log. Any rocking tendency which may be produced, is therefore, resisted by the two-bunk support of the trailer, and the side strain on the reach in a vertical plane, is substantially eliminated. The side strain upon the reach in the horizontal plane is very much reduced in effect by the bracing of the hounds, which bracing it is impossible to secure in a vertical plane.

I have thus found that by this construction I may employ a much lighter reach than before and at the same time reduce the chance of breakage.

One of the bunks, as the bunk 7, is provided with chocks 72, which may be of any type desired and are, preferably, adjustable in position lengthwise of the bunk. As the type of chock used forms no part of my present invention, its detail construction will not be described.

What I claim as my invention is:—

1. A trailer truck comprising an axle, two wheels thereon, a reach, a load supporting frame having fore-and-aft-separated load engaging members located well above the axle, and supporting means for said frame normally holding it in a central position and permitting a limited rocking movement about the axle independent of the reach.

2. A trailing truck for logging comprising an axle, wheels thereon, two transverse bunks fixedly secured together and located above and respectively before and behind the wheels and extending to substantially the outer edges of the wheels and springs supporting said bunks from the axle and permitting a limited rocking movement about the axle.

3. A trailer truck comprising an axle, wheels thereon, a reach, fixed relative to the axle when in use, a load supporting frame comprising two bunks located respectively in front of and to the rear of the axle and means supporting said frame from the axle and permitting a limited rocking movement of the frame about the axle and independent of the reach.

4. In a trailing truck, in combination, an axle, two wheels thereon, a reach, hounds having guides for the reach, semi-elliptical springs mounted on the axle just within each wheel, a beam extending from front to rear over and supported by each spring, two transverse bunks supported by the ends of said beams and having their ends extending to the outside limits of the wheels and their upper surfaces above the tops of the wheels.

5. A trailer having a single axle, load carrying wheels thereon, a reach, two beams extending from front to rear at opposite sides of the trailer, means yieldingly supporting said beams from the axle to permit a limited rocking movement upon the axle, and two bunks carried by the ends of said beams at an elevation to maintain their tops above the tops of the wheels respectively to the front and to the rear thereof, the ends of said bunks extending to the outer side limits of the wheels.

6. A trailer truck comprising an axle, wheels thereon, a reach, means for adjustably fixing the reach to the axle, and a plurality of fore-and-aft-separated load-supporting means carried from the axle extending to the outer side limits of the wheels and adapted for limited rocking movement independent of the reach.

7. A trailer truck comprising an axle, wheels thereon, a reach, and a plurality of fore-and-aft-separated load supporting means carried by the axle and extending to the outer side limits of the wheels and at a level above the tops of the wheels, said means being supported for limited rocking movement upon the axle independent of the reach.

8. A trailing truck for logging comprising an axle, two wheels thereon, and two transverse bunks fixed together and extending to the outer edges of the wheels and placed respectively forwardly and rearwardly of the wheels and with their upper surfaces above the tops of the wheels, and supporting means for said bunks permitting a limited rocking movement of the bunks relative to the axle.

9. A trailing truck for logging comprising an axle, two wheels thereon, a bunk frame comprising two beams extending from front to rear direction just inside the wheels, two transversely extending bunks supported from the ends of the said beams and extending to the outer side limits of the wheels and at an elevation above the tops of the wheels, and spring supports for said beams from the axle, permitting a limited rocking movement of the bunk frame about the axle.

Signed at Seattle, Washington, this 26th day of June, 1916.

FREDERICK W. CHRISWELL.